(12) United States Patent
Elango et al.

(10) Patent No.: US 7,809,745 B2
(45) Date of Patent: Oct. 5, 2010

(54) METHOD FOR GENERATING STRUCTURED QUERY RESULTS USING LEXICAL CLUSTERING

(75) Inventors: Pradheep Elango, Mountain View, CA (US); Stephen O'Sullivan, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 289 days.

(21) Appl. No.: 11/836,277

(22) Filed: Aug. 9, 2007

(65) Prior Publication Data

US 2009/0043753 A1    Feb. 12, 2009

(51) Int. Cl.
*G06F 17/30* (2006.01)
(52) U.S. Cl. .................. 707/765; 707/759; 707/766
(58) Field of Classification Search .......... 705/14; 707/765, 766, 759
See application file for complete search history.

(56) References Cited

U.S. PATENT DOCUMENTS 6,647,383 B1 * 11/2003 August et al. ............. 707/3
6,876,997 B1 * 4/2005 Rorex et al. ............. 707/3
2008/0208820 A1 * 8/2008 Usey et al. .............. 707/3
2008/0222140 A1 * 9/2008 Lagad et al. ............. 707/5

* cited by examiner

*Primary Examiner*—Khanh B Pham
*Assistant Examiner*—Johnese Johnson
(74) *Attorney, Agent, or Firm*—Seth H. Ostrow; Ostrow Kaufman & Frankl LLP

(57) ABSTRACT

The present invention provides for the generation of structured query results using lexical clustering which includes collecting one or more search queries and data associated with the one or more search queries. The present invention further includes preprocessing the one or more queries into a canonicalized form of each of the one or more queries. The canonicalized form of each of the one or more queries may be accomplished using stemming, punctuation, pluralization, word order or other canonicalization rules. The present invention further includes building a lexical index of the one or more search queries and data associated with the one or more search queries and mining the lexical index of the one or more search queries and data associated with the one or more search queries in order to generate a structured query result set.

13 Claims, 4 Drawing Sheets

METHOD FOR GENERATING STRUCTURED QUERY RESULTS USING LEXICAL CLUSTERING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to structuring query reports. More particularly, the method of using lexical clustering to assist in the grouping of query data to provide a hierarchal structure for advertiser query data.

BACKGROUND OF THE INVENTION

A number of techniques are known to those of skill in the art for generating query reports. Specifically, in the field of on-line advertising, query reports representative of the number of "clicks" of on-line advertisements corresponding to a search query, are regularly sent to advertisers. Advertisers may use these query reports to determine keywords upon which to place bids, to improve the content of advertisements, and to improve relevance of advertisements to keywords. Similarly, search providers may use query reports to develop potential bidding keywords, to suggest new advertisements groups based upon end-user feedback (which is determined from click rates) and to improve relevance through the feedback of end-users.

Analysis of these query reports, however, requires humans to engage in a tedious interaction with a given query report to locate unique or interesting search queries. Search providers typically use unique or interesting search queries to better understand end user queries and thereby improve relevance and develop new potential bidding keywords that may be sold to advertisers. Similarly, advertisers use unique or interesting search queries in order to determine keywords upon which to bid and to improve the content of advertisements. The process of manually identifying unique or interesting keywords, however, does not guarantee accuracy or comprehensiveness. As such, both advertisers and search providers experience unreliable and incomplete performance in their analysis of search queries and, therefore, there exists a need for improved methods, systems and computer program products for generating structured search query reports.

SUMMARY OF THE INVENTION

Generally, the present invention provides for the generation of structured query results using lexical clustering. As described above, query results are provided in query reports which summarize the number of clicks an on-line advertisement received where the advertisement was present to an end-user in response to a search query. The present invention includes collecting one or more search queries and data associated with the one or more search queries such as the number of clicks on the search query result, the number of clicks on the advertisements corresponding to the search query result, and the rank of the search query result. The present invention further includes preprocessing the one or more queries into a canonicalized form of each of the one or more queries. The canonicalized form of each of the one or more queries may be accomplished using stemming, punctuation, pluralization, word order or other canonicalization rules.

The present invention further includes building a lexical index of the one or more search queries and data associated with the one or more search queries and mining the lexical index of the one or more search queries and data associated with the one or more search queries in order to generate a structured query result set.

The structured query result set serves an improved tool for advertisers as well as an improved recommendation tool for sponsored search terms. The structured query result set also serves to improves content quality and provide relevance feedback, as well as provide for landing page optimization, creative optimization and quick licks suggestions.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
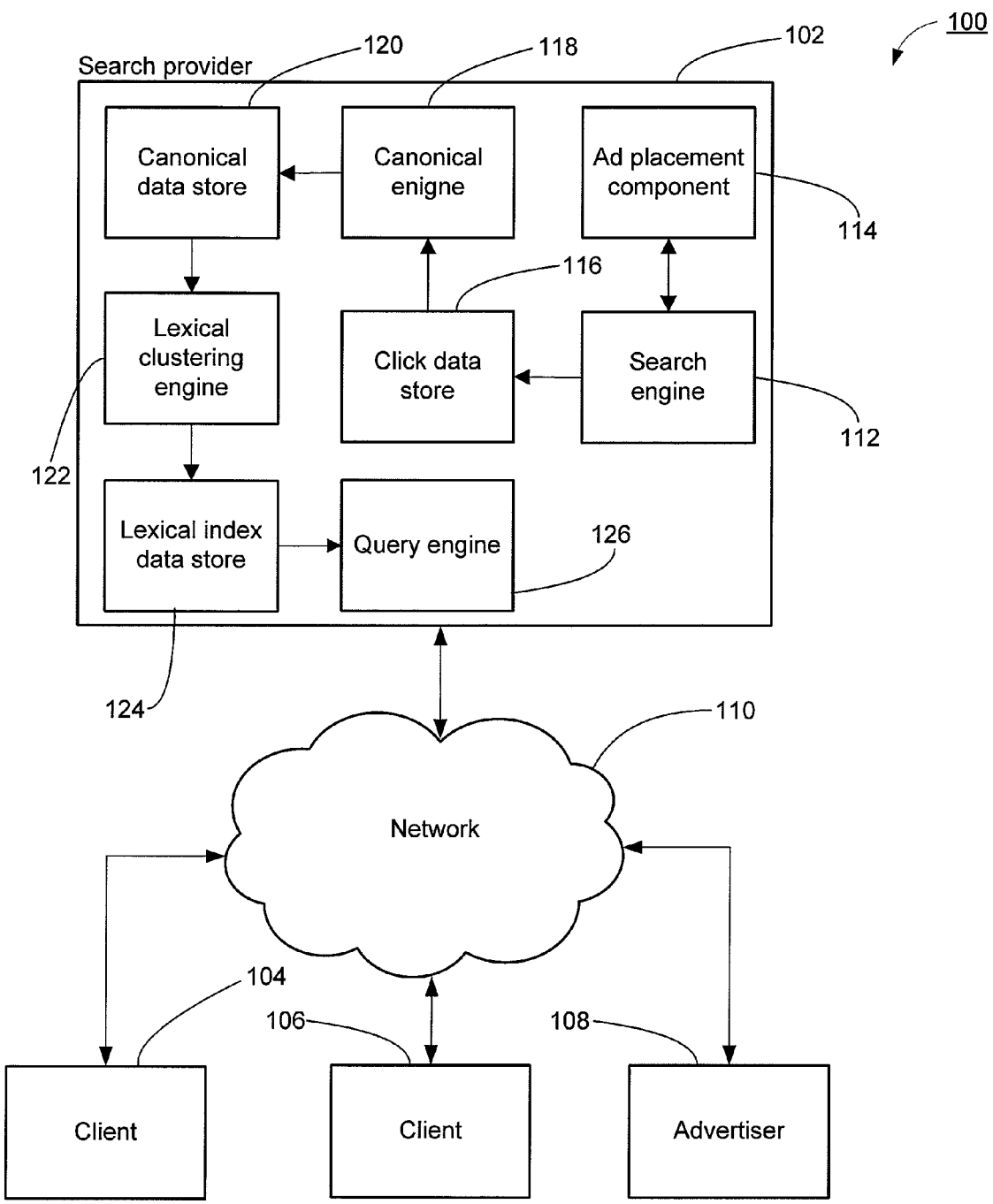
FIG. 1 illustrates a block diagram of a system for generating structured query results utilizing lexical clustering according to one embodiment of the present invention.

FIG. 1 illustrates a system 100 that includes a search provider 102, a first client 104, a second client 106, an advertiser 108, and a computer network 110. The search provider 102 comprises a search engine 112, an ad placement component 114, a click data store 116, a canonical engine 118, a canonical data store 120, a lexical clustering engine 122, a lexical data store 124 and a query engine 126. Those of skill in the art recognize that the search provider may utilize more or fewer components and data stores, which may be local or remote with regard to a given component or data store.

Clients 104 and 106 are in communication with the advertiser 108 and search provider 102 via the computer network 110. The computer network 110 may be any type of computerized network capable of allowing devices to receive and transmit data, such as the Internet. The click data store 116, the canonical data store 120 and the lexical index data store 124 may be one or more data storage devices of any suitable type, operative to store corresponding data therein. For example, a given data store may comprise a flat file data store (tab or comma delimited data store), a relational database, an object oriented database, a hybrid object-relational database, etc.

In accordance with one embodiment, the first client 104 and the second client 106 communicate across the computer network 110 with the search provider 102. The first client 104 transmits one or more search queries over the network 110 to the search provider 102. A typical search query comprises one or more terms. For example, the query "track shoes" comprises two terms. The second client 106 transmits one or more search queries over the network 110 to the search provider in a similar manner as the search queries transmitted by the first client 104, but may comprise additional or different search terms. For example, the search query "winged track shoes" contains three terms, one additional term as compared to the query "track shoes", but is a similar search query which provides a further search term, e.g. "winged". Another search query may be "comfortable track shoes", which also comprises three terms, one additional term as compared to the query "track shoes", and a different search term as compared to the query "winged track shoes", "comfortable" as compared to "winged".

The search engine 112 at the search provider 102 receives the search queries of both the first client 104 and the second client 106 and utilizes the search terms comprising a given query to identify a result set of one or more content items that fall within the scope of a given query. The search engine 112 may search for content items that are available on the network 110. The search engine 112 utilizes the data associated with the content items that are responsive to the given query and generates a result set. In addition to searching for and locating content items that are responsive to a given query, the search engine 112 may pass one or more of the search queries to the ad placement component 114, which may retrieve one or more advertisements on the basis of an given search query. The search engine 112 receives the one or more advertisements from the ad placement component 114 that correspond to a given search query and incorporates the one or more advertisements into the result set for the given search query.

The search engine 112 transmits the result set for a given search query over the network to the client 104 and 106 from which the search engine 112 receives the given query. The given client 104 and 106 may select a given content item in the corresponding result set or may select an advertisement that is incorporated in the corresponding result set. When the client 104 and 106 selects an advertisement, information regarding the selection (e.g. a click on the advertisement) is directed to the search provider 102, which records the click event and the associated search query in the click data store 116 at the search provider 102. Multiple click events and the associated search queries for one or more advertisements may be recorded in the click data store 116.

One or more of the search queries associated with click events may be passed to the canonical engine 118, where the search queries are processed to derive a canonicalized form of a given one of the one or more search queries, which is described in greater detail below. The canonicalized form of a given one of the one or more search queries is stored in the canonical data store 120 at the search provider 102.

The click events and the associated canonicalized search queries for one or more advertisements may be passed to the lexical clustering engine 122. The lexical clustering engine 122 builds a lexical index of search queries, associated click records and other associated information, which is described in greater detail below. The index is stored in the lexical index data store 124 at search provider 102. The query engine 126 at the search provider 102 mines the index stored in the lexical index data store 124 in response to a query from a given advertiser 108 to generate a result of search queries which are structured based upon lexical clusters, e.g. a given word of a search query, which is also described in greater detail below.

Figure 2:
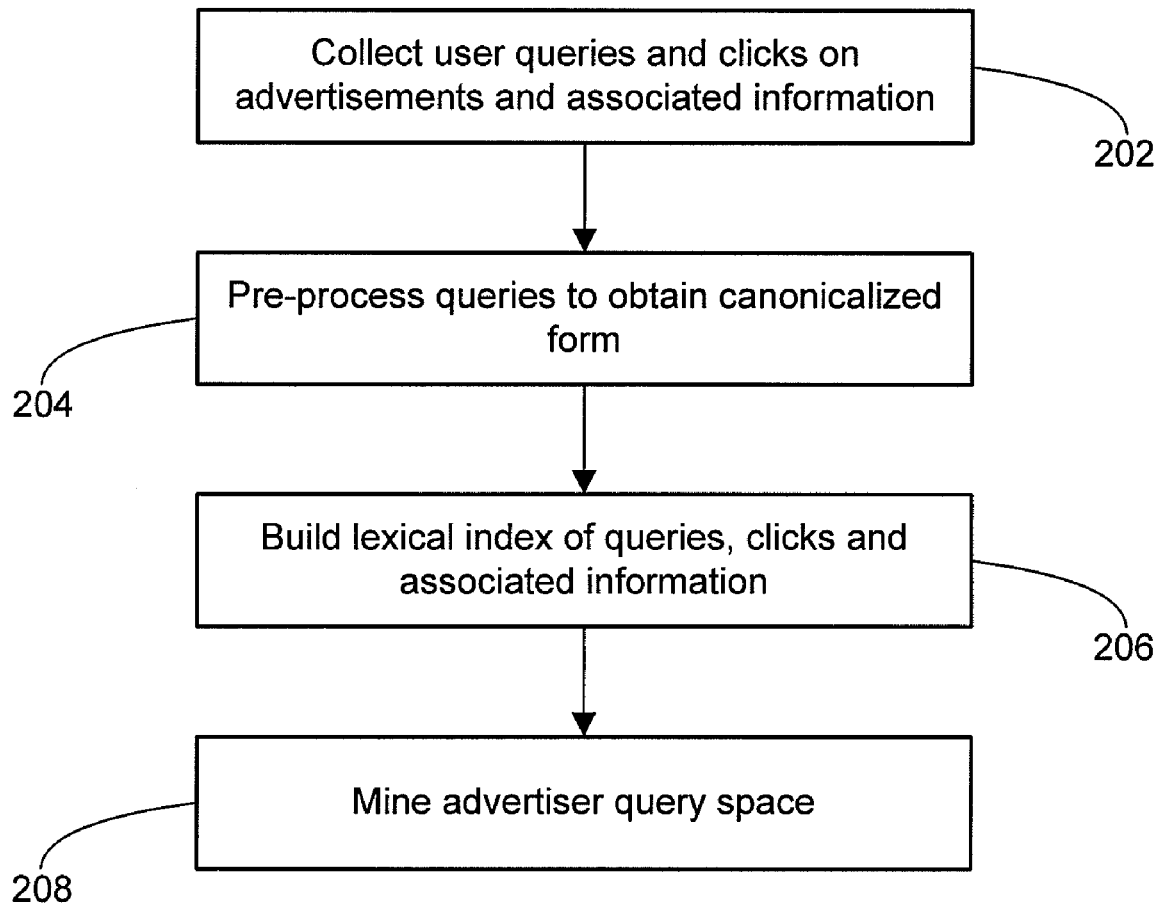
FIG. 2 illustrates a flow diagram presenting a method for generating structured query results utilizing lexical clustering according to one embodiment of the present invention.

FIG. 2 illustrates a flow diagram presenting a method for generating structured query reports utilizing lexical clustering according to one embodiment of the present invention. In accordance with the embodiment of FIG. 2, the method may begin by collecting user search queries, clicks on advertisements and associated information, step 202. As described above with respect to FIG. 1, this may be received by the search provider 102. Pre-processing is applied to the queries to obtain a canonicalized form of a given query, step 204. As discussed above with respect to FIG. 1, this may be performed by the canonical engine 118 at the search provider 102, which may utilize a canonicalization tool incorporating certain canonicalization rules, e.g. stemming rules, punctuation rules, pluralization rules, or word order rules, to arrive at the canonicalized form of a given query. For example, search queries such as "winged track shoes" and "comfortable track shoes" may be categorized under the canonicalized form "track shoe". Further canonicalization may occur where search queries such as "Winged track Shoes", "shoe with winged track", "shoe and winged track" and "winged track shoe" may be categorized under the canonicalized form "winged track shoe", which may be categorized under the canonicalized form "track shoe".

A lexical index of queries, clicks and associated information is built, step 206. Building the lexical index may be performed by the lexical clustering engine 122 at the search provider 102. The advertiser query space, e.g. a lexical index of search queries, associated click records and other associated information, may be mined in order to generate a result of search queries which are structured based upon lexical clusters, step 208. As discussed above with respect to FIG. 1, this may be performed by the lexical clustering engine 122 at the search provider 102.

Figure 3:
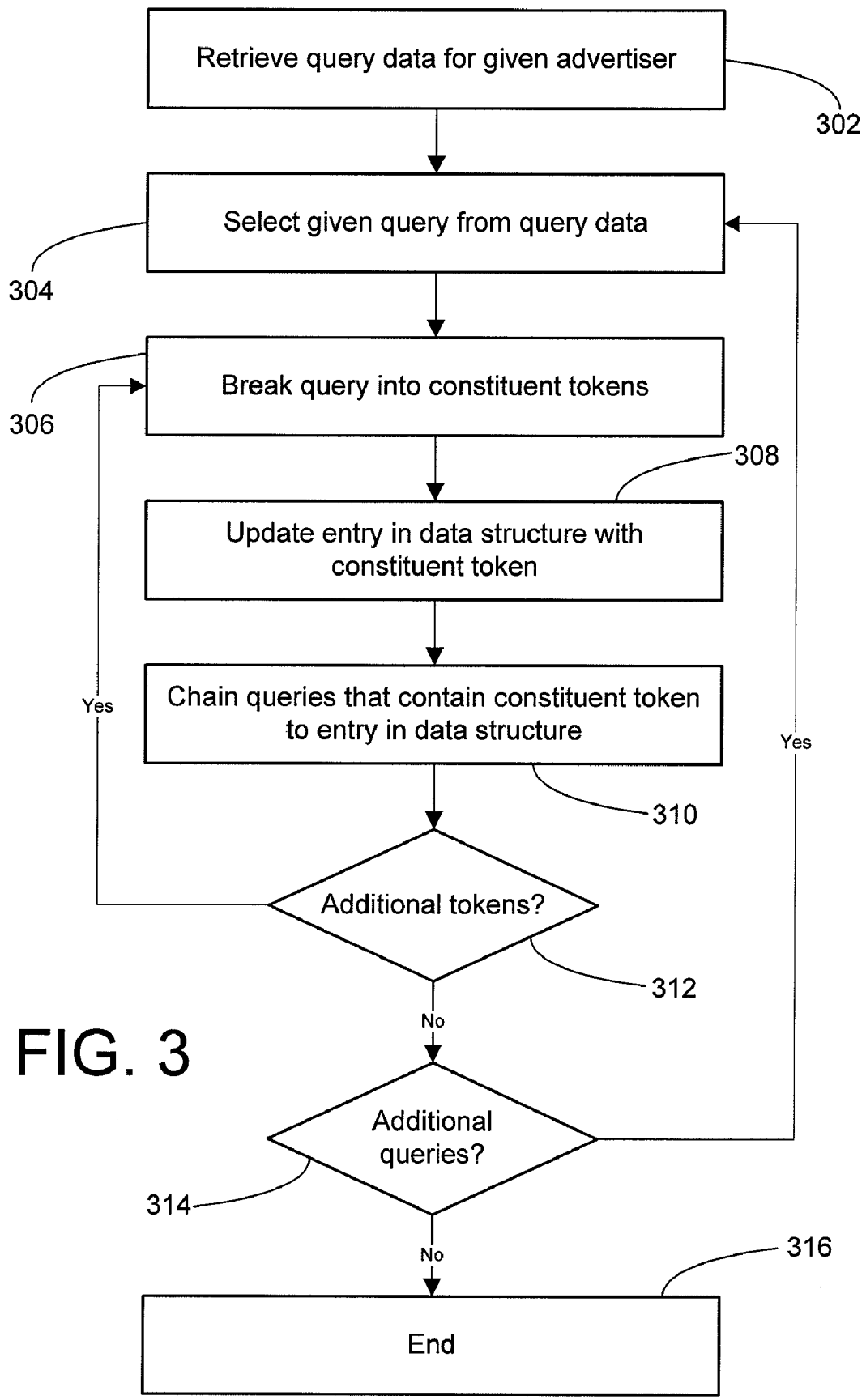
FIG. 3 illustrates a flow diagram presenting a method for building a lexical index of search queries, clicks on advertisements and associated information according to one embodiment of the present invention.

FIG. 3 illustrates a flow diagram presenting a method for building a lexical index of search queries, clicks on advertisements and associated information according to one embodiment of the present invention. In accordance with the embodiment of FIG. 3, the method may begin with the retrieval of search query data for a given advertiser, step 302. As discussed above with respect to FIG. 1, the system may store search query data in the click data store 116 for retrieval by the lexical clustering engine 122. In accordance with an alternative embodiment, the search query data may be in the form of a text file. According to other embodiments, a SQL query may be used to extract the search query data from the click data store 116.

A given search query may be selected from the search query data, step 304, which is performed by the lexical clustering engine 122 of FIG. 1. An algorithm of the lexical clustering engine 122 of FIG. 1 may break the selected search query into constituent tokens, e.g. terms comprising the selected search query, step 306. For example, if the selected search query is "winged track shoes", the lexical clustering engine 122 of FIG. 1 may separate the search query into the terms "winged", "track" and "shoes".

An entry in a data structure is updated using the constituent tokens, step 308. For example, if the selected search query is "winged track shoes" and the constituent tokens are the terms "winged", "track" and "shoes", an entry may be made in a data structure for the term "winged", along with the associated click records and other associated information. In the event that an entry for the term "winged" already exists in the data structure, then the entry may be updated with the associated click records and other associated information. In accordance with an alternative embodiment, the constituent tokens may be entered and updated in a hash data structure.

Queries that contain the constituent token are chained to the entry in the data structure, step 310. For example, the entry for the constituent token "winged" may be linked or chained to the search queries "Winged track Shoes", "shoe with winged track", "shoe and winged track" and "winged track shoe." The chained list of queries may be maintained by a singly linked list which comprises integer identifiers. The integer identifier is a pointer to an array index that corresponds to an entry in a search query array, which according to one embodiment is a dynamically growing array that contains the canonicalized search query. Search query entries in the search query array, which include the canonicalized search query and summary statistics corresponding to the canonicalized search query, may be arranged in a particular order. The particular order may be based upon any metric, e.g. descending number of user clicks.

The original or raw search query which corresponds to the canonicalized search query is stored in a separate linked list, where a pointer from a canonicalized search query links the canonicalized search query to the raw search query. For example, the entry for the constituent token "winged" is chained to a singly linked list which contains an array index, e.g. integer identifier such as 1. The array index of 1 corresponds to the entry "winged track shoe" in the search query array. The entry "winged track shoe" in the search query array may have pointers to the raw search query entries "Winged track Shoes", "shoe with winged track", "shoe and winged track" which are maintained in one or more separate linked lists.

The next step, step 312, includes determining whether there are additional constituent tokens for the selected search query. For example, for the selected search query, "winged track shoes", comprises a second and third constituent token exists, "track" and "shoes", respectively. Therefore, since additional constituent tokens exist, program flow returns to step 306 and the process repeats. If, however, a determination is made as to the absence of an additional one or more tokens comprising the selected search query, then a determination is made as to whether there exist additional search queries in the search query data for a given advertiser, step 314. In the event an additional search query does exist, program flow returns to step 304 and the process repeats. If no further search queries exist in the search query data, the method ends, step 316.

Figure 4:
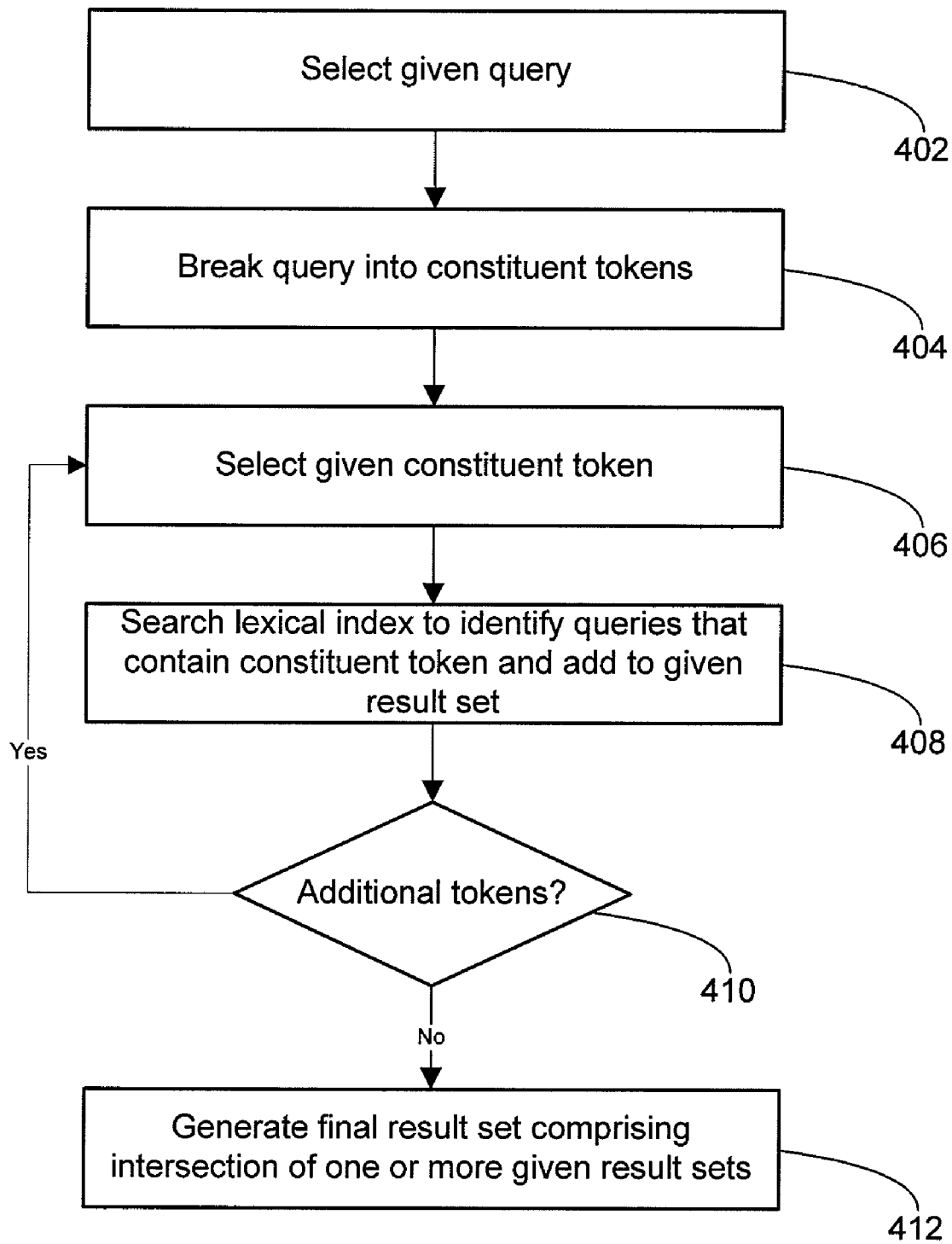
FIG. 4 illustrates a flow diagram presenting a method for mining an advertiser query space generated through the user of lexical clustering according to one embodiment of the present invention.

FIG. 4 illustrates a flow diagram presenting a method for mining an advertiser query space according to one embodiment of the present invention. In accordance with the embodiment of FIG. 4, the method may begin by selecting a given search query from the search query data, step 402. The selected search query may then be broken into one or more constituent tokens, e.g. terms comprising a given query, step 404. For example, if the selected search query is "track shoes", the lexical clustering engine 122 of FIG. 1 would separate the search query into the terms "track" and "shoes". The query engine 126 of FIG. 1 may then select a given constituent token from the set of one or more constituent tokens derived from the search query, step 406. In another embodiment, the constituent token may be selected in order of the least amount of associated search queries to thereby improve the efficiency by which the method is executed.

The lexical index of search queries, clicks on advertisements and associated information is searched to identify search queries that contain the selected constituent token, which may be added to the located search queries into a result set, step 408. For example, if the selected search query is "track shoes", and the selected constituent token is "track", a search of the lexical index may result in the located canonicalized search queries "track shoe", "winged track shoe", and "comfortable track shoe", which may subsequently be added to a given result set along with the corresponding raw search query entries. For example, the canonicalized search query "winged track shoe" may include the raw search query entries to which it points, e.g., "Winged track Shoes", "shoe with winged track", and "shoe and winged track".

A determination is made as to whether there are additional constituent tokens from the selected search query, step 410. For example, for the selected search query, "track shoes", a second constituent token exists, "shoes". Therefore, since an additional constituent token exists, the method repeats again at step 406. The second selected constituent token, "track", would initiate a second search of the lexical index which may result in the location of canonicalized search queries "track shoe", "winged track shoe" and "comfortable track shoe" in the search query array which points to corresponding raw search query entries and which may be subsequently added to a second result set.

Once a determination is made that additional constituent tokens from the selected search query do not exist, a final result set may be generated (which may be performed by the query engine 126 of FIG. 1) comprising the intersection of one or more given result sets, step 412, which is stored in a data structure, e.g. linked hash set. For example, for the selected search query, "winged track shoes", an intersection of the one or more given result sets would result in the generation of a final result set of the canonicalized search queries "track shoe", "winged track shoe" and "comfortable track shoe" and the corresponding raw search query entries. In accordance with an alternative embodiment, the data structure to store the final set comprising the intersection of one or more given result sets may be a tree or a linked list.

The final result set may therefore be a structured index of search queries with corresponding associated information. For example, the index may be organized where the first level contains the search query "track shoe", the second level contains the search query "winged track shoe" and the third level contains the search queries "Winged track Shoes", "shoe with winged track", and "shoe and winged track". In accordance with an alternative embodiment, associated click information may listed with each search query at each level within the hierarchy. In another embodiment, associated information such as rank may be listed with a given search query at a given level within the hierarchy. In another embodiment, the final result set may be stored as an of output hierarchal data in an XML format, which allows the structure in the final result set to be preserved. In another embodiment, Oracle XML capabilities may be used to store the final result set.

Accordingly, the present invention provides for the generation of a structured query result set using lexical clustering which serves as an improved tool for advertisers, as well as an improved recommendation tool for sponsored search terms. The structured query result set may also serve to improve content quality and provide relevance feedback, as well as provide for landing page optimization, creative optimization and quick link suggestions. In summary, the present invention provides advertisers a tool to explore and understand their users' needs, which can be used to improve the content and/or advertisements.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for generating structured query results, the method comprising:
    collecting one or more queries submitted through a search engine interface, the queries each including one or more search terms;
    collecting search term data including click information associated with the one or more queries;
    preprocessing the one or more queries into a canonicalized form of each of the one or more queries;
    building a lexical index comprised of the canonicalized form of the one or more queries and the search term data associated with the one or more queries;
    mining the lexical index of the canonicalized form of the one or more queries and the search term data associated with the one or more queries; and
    generating a structured query result based on the mining of the lexical index.

2. The method of claim 1 wherein the data associated with the one or more queries includes number of clicks on advertisements associated with the one or more queries.

3. The method of claim 1 wherein the data associated with the one or more queries includes number of clicks on the one or more queries.

4. The method of claim 1 wherein the data associated with the one or more queries includes the rank of the one or more queries.

5. The method of claim 1 wherein the step of preprocessing the one or more queries into a canonicalized form of each of the one or more queries includes using one or more canonicalization rules.

6. The method of claim 5 wherein the one or more canonicalization rules includes at least one of a stemming rule, a punctuation rule, a pluralization rule, and a word order rule.

7. The method of claim 1 wherein the step of building a lexical index of the one or more queries and data associated with the one or more queries includes:
    retrieving query data for a given advertiser;
    selecting a query from the query data;
    separating the query into a set of constituent tokens;
    updating an entry in a data structure using a first constituent token of said set of constituent tokens; and
    chaining queries that contains said first constituent token of said set of constituent tokens.

8. The method of claim 7 further comprising:
    determining the existence of one or more constituent tokens remaining in said set of constituent tokens;
    updating one or more entries in a data structure using the one or more constituent tokens of said set of constituent tokens; and
    chaining queries that contain the one or more constituent tokens of said set of constituent tokens.

9. The method of claim 7 wherein the constituent token includes a query term.

10. The method of claim 7 wherein the entry in a data structure includes:
    the constituent token; and
    the data associated with the query from which the constituent token derived from.

11. The method of claim 7 wherein the step of chaining queries that contain said first constituent token of said set of constituent tokens includes:

maintaining a search query array of canonicalized search queries;

maintaining a linked list of one or more raw search queries that correspond to one or more canonicalized search queries in the search query array of canonicalized search queries;

pointing the one or more canonicalized search queries in the search query array of canonicalized search queries to the corresponding one or more raw search queries;

maintaining a singly linked list of integer identifiers wherein each integer identifier corresponds to the search query array of canonicalized search queries; and linking the first constituent token to the singly linked list of integer identifiers.

12. The method of claim 8 wherein the step of chaining queries that contain the one or more constituent tokens of said set of constituent tokens includes:

maintaining a search query array of canonicalized search queries;

maintaining a linked list of one or more raw search queries that correspond to one or more canonicalized search queries in the search query array of canonicalized search queries;

pointing the one or more canonicalized search queries in the search query array of canonicalized search queries to the corresponding one or more raw search queries;

maintaining a singly linked list of integer identifiers wherein each integer identifier corresponds to the search query array of canonicalized search queries; and linking the one or more constituent tokens to the singly linked list of integer identifiers.

13. The method of claim 1 wherein the step of mining the lexical index of the one or more queries and data associated with the one or more queries includes:

selecting a query from the query data;

separating the query into a set of constituent tokens;

selecting one or more constituent tokens from the set of constituent tokens;

searching the lexical index to identify one or more queries that contain one or more constituent tokens from the set of constituent tokens;

generating one or more result sets of the one or more queries identified for each of the one or more constituent tokens from the set of constituent tokens; and generating a final result set comprising the intersection of the one or more result sets of the one or more queries identified for each of the one or more constituent tokens from the set of constituent tokens.

* * * * *